US008908602B2

(12) United States Patent
Yoshiuchi et al.

(10) Patent No.: US 8,908,602 B2
(45) Date of Patent: Dec. 9, 2014

(54) CLUSTERING METHOD OF MOBILE COMMUNICATION AND REMOTE RADIO HEAD THEREOF

(75) Inventors: Hideya Yoshiuchi, Beijing (CN); Lu Geng, Beijing (CN)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 13/403,096

(22) Filed: Feb. 23, 2012

(65) Prior Publication Data

US 2012/0224541 A1    Sep. 6, 2012

(30) Foreign Application Priority Data

Mar. 2, 2011  (CN) .......................... 2011 1 0056054

(51) Int. Cl.
*H04W 4/00*   (2009.01)
*H04B 7/04*   (2006.01)
*H04W 16/10*  (2009.01)
*H04W 88/08*  (2009.01)

(52) U.S. Cl.
CPC ............ *H04W 16/10* (2013.01); *H04W 88/085* (2013.01)
USPC .......................................... 370/328; 455/525

(58) Field of Classification Search
CPC ... H04W 72/04; H04W 16/28; H04W 88/085; H04L 1/06; H04Q 1/245; H03H 7/46
USPC ............... 370/329, 334, 339; 455/561, 562.1, 455/575.7
See application file for complete search history.

(56) References Cited

U.S. PATENT DOCUMENTS

| 2010/0290413 | A1  | 11/2010 | Kuwahara |
| 2011/0268077 | A1  | 11/2011 | Wan et al. |
| 2011/0312363 | A1* | 12/2011 | Kolding et al. ............... 455/513 |
| 2013/0201953 | A1* | 8/2013  | Kang et al. ..................... 370/329 |
| 2013/0286997 | A1* | 10/2013 | Davydov et al. ............. 370/329 |

FOREIGN PATENT DOCUMENTS

| CN | 101185270 A | 5/2008 |
| CN | 101389115   | 3/2009 |
| CN | 101562900 A | 10/2009 |
| CN | 101577940 A | 11/2009 |
| CN | 101631379   | 1/2010 |
| CN | 101777941 A | 7/2010 |
| JP | A-2010-268192 | 11/2010 |
| WO | WO 2007/056891 A | 5/2007 |
| WO | WO 2010/077192 A1 | 7/2010 |
| WO | WO 2010/124647 A1 | 11/2010 |

* cited by examiner

*Primary Examiner* — Habte Mered
(74) *Attorney, Agent, or Firm* — Nicholas Trenkle; Stites & Harbison, PLLC.

(57) ABSTRACT

A mobile communication system of the present invention includes a plurality of remote radio heads configured to transmit a signal to user equipment and configure an antenna network and a centralized baseband pool configured to be connected to the antenna network. The centralized baseband pool performs clustering with respect to the plurality of remote radio heads so as to dynamically vary the number of the remote radio heads each included in a plurality of clusters.

8 Claims, 8 Drawing Sheets

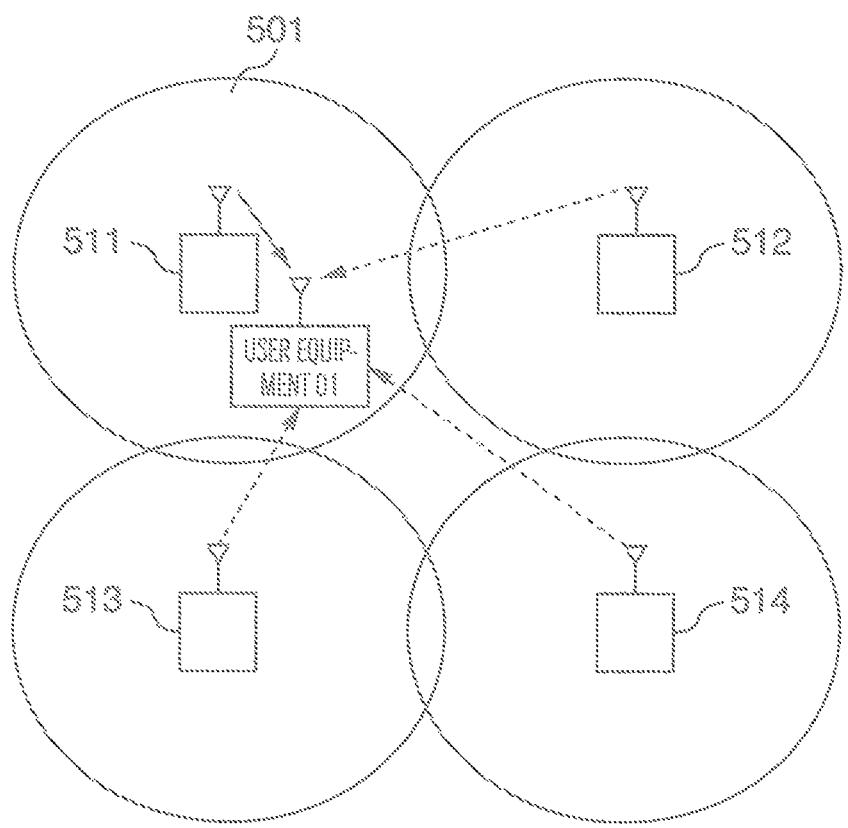

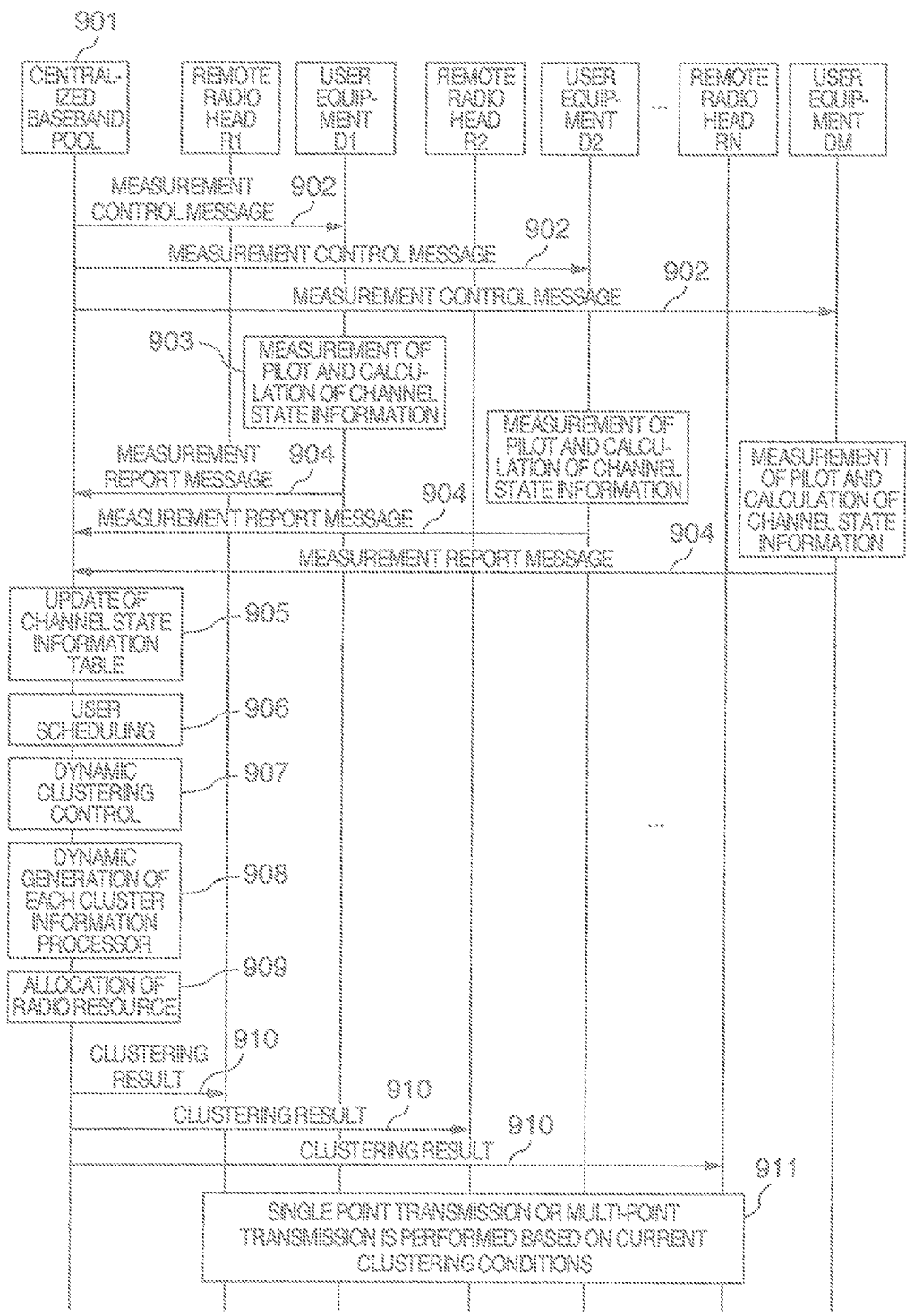

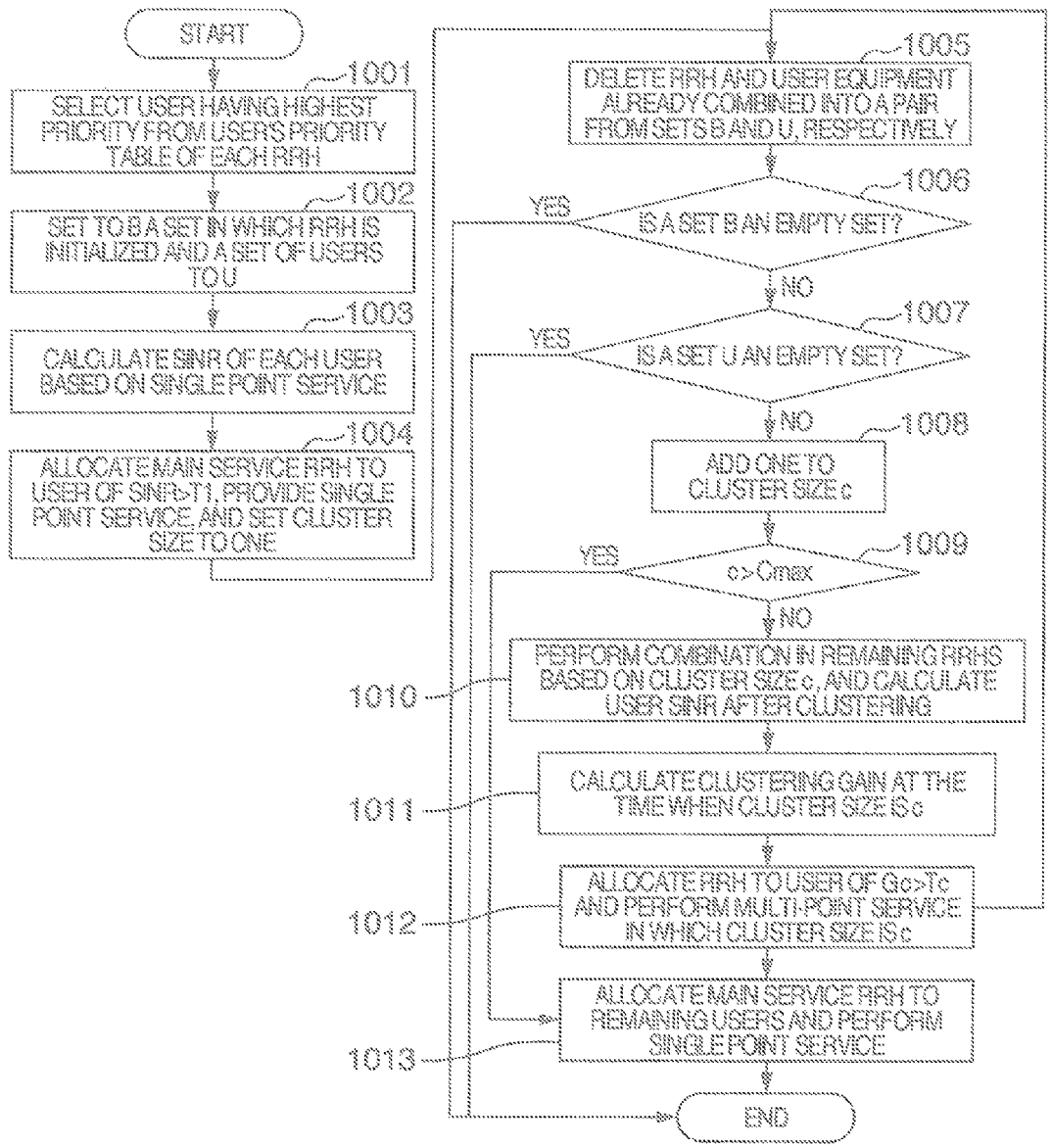

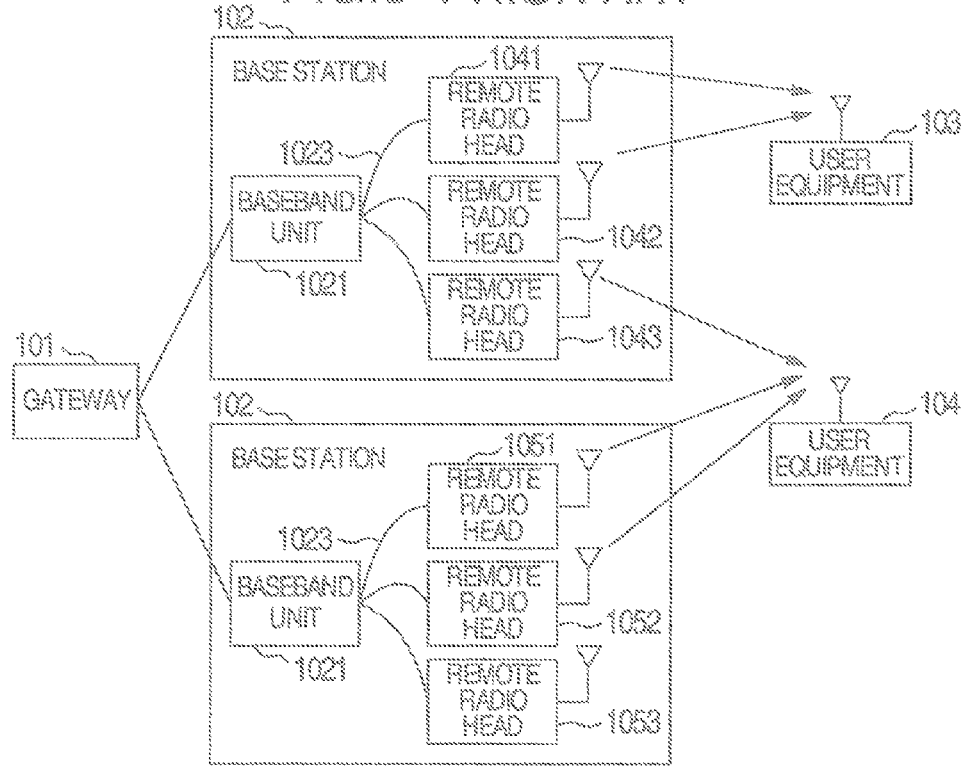
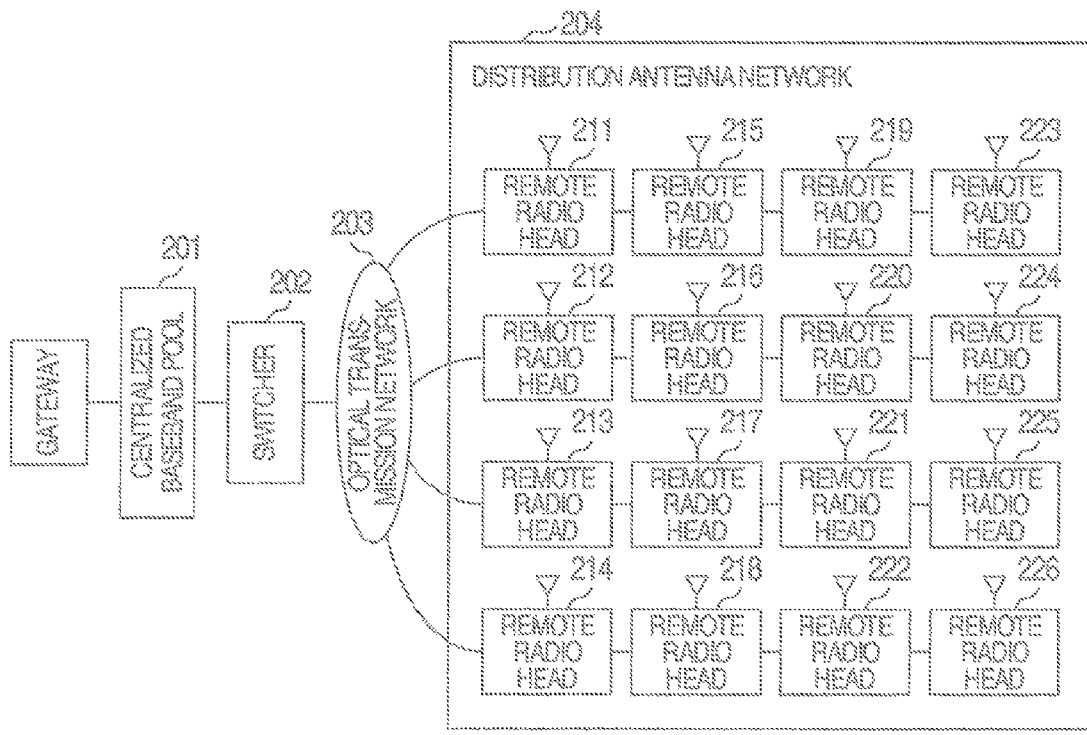

CLUSTERING METHOD OF MOBILE COMMUNICATION AND REMOTE RADIO HEAD THEREOF

INCORPORATION BY REFERENCE

The present application claims priority from Chinese application CN 201110056054.6 filed on Mar. 2, 2011, the content of which is hereby incorporated by reference into this application.

BACKGROUND OF THE INVENTION

The present invention, relates to a mobile communication system which supports multiple-base station coordination service and a remote radio head clustering method thereof, and has high flexibility and saves radio resources.

Along with an increase in mobile users and a high request for a data rate, a conventional cellular network fails to satisfy needs of a number of users more and more. 3rd-Generation Partnership Project (The 3GPP) being an international standardization organization develops a system architecture and specifications of second generation and third generation mobile communication networks, and the specifications are currently already applied to a network in which an air interface is arranged. At present, the 3GPP makes start on an establishment of Long Term Evolution Version (LTE) and Long Term Evolution-Advanced Version (LTE-A) in preparation for a fourth generation mobile communication network. As its aim, the 3GPP increases a spectrum utility factor (throughput/bandwidth) of a system and particularly a spectrum utility factor of a cell edge.

However, since using the same frequency in adjacent cells, an LTE/LTE-A system causes strong interference between cells. When radio modules of a base station are arranged in a separate place by using an optical fiber, they serve as remote radio heads. They are distributed and arranged in the base station determined by a network scheme, and cover a cover range of an original integral base station. Each remote radio head uses small transmission power and as a result, obviously reduces interference between cells. This is a concept of a first distribution antenna system.

Further, a Coordinated Multi-point Transmission/Reception (CoMP) is used as one of methods for effectively reducing interference between cells. In the second generation and third generation mobile communication networks, one cell provides service for one user. Hereinafter, it is abbreviated to a "single point transmission". The single point transmission is to perform transmission and reception from a pair of antennas very close to each other. A normal distance between the above antennas is several wavelengths, and they receive fading for the same long time. A pair of antennas is referred to as one "point". In the following embodiment, for example, any of "one base station having a pair of omnidirectional antennas", "one sector of a base station divided into sectors", one "home base station", one "relay station", and one "remote radio head" in a distribution antenna system can be considered as the "single point transmission". A cover range of one "point" is known generically as a "cell". A "multi-point transmission" is to perform transmission and reception from a plurality of antenna groups not close to each other. A normal distance between these antenna groups is several wavelengths, and they receive fading for the different long time. In the following embodiment, for example, any of a CoMP between base stations, a CoMP between sectors (including multiple sectors of the same base station and multiple sectors of different base stations), a CoMP between multiple remote radio heads, and a CoMP between a base station and a relay station can be considered as a "multi-point coordinated transmission/reception". In the CoMP, beam forming can be performed based on a distance between user equipment and each point, and interference between cells can be removed or used. In the patent, for studying the distribution antenna system, a so-called point serves as a remote radio head. When using a pair of omnidirectional antennas, each remote radio head has a separate cell ID.

The distribution antenna system of a conventional technology will be described below with reference to FIG. 8.

FIG. 8 illustrates a typical service scene of the distribution antenna system based on a conventional LTE/LTE-A base station. The base station 102 is connected to a gateway 101 and accesses other networks. The base station 102 includes a baseband unit 1021, and remote radio heads 1041 to 1043, and 1051 to 1053. The baseband unit 1021 performs, as a main function, baseband processing of a signal, including coding/decoding, and modulation/demodulation. The remote radio head 1041-1043, 1051-1053 performs, as a main function, an A/D conversion of signals, frequency conversion, filtering, amplification, and radio transmission. The remote radio heads 1041 to 1043 and the remote radio heads 1051 to 1053 are connected via an optical fiber 1023 and the baseband units 1021. In this distribution antenna system, the COMP is used. At one time, a service received by user equipment 103 is a coordination transmission of two remote radio heads 1041 and 1042 belonging to the same base station. On the other hand, a service received by user equipment 104 is a coordination transmission of three remote radio heads 1043, 1051, and 1052 belonging to different-base stations.

However, since receiving a limitation of a peculiar constitution of a cellular cell, the above-described distribution antenna system has various insoluble problems. For example, any of respective base stations of the system ought to make a monopoly of one base station address. It means that independent machine room, air conditioner, and electric-supply equipment ought to be put in place, and the above-described constitution is accompanied by enormous cost in the construction and maintenance of the base station. In the LTE system, a concept of the CoMP is further proposed. However, radio resources are allocated only to a limited coordinated cell, and therefore, large-sized resources fails to be optimized. For preventing the above-described problem, a new system architecture needs to be introduced into a future high-speed radio communications system. A distribution antenna system based on a centralized baseband pool is a new radio access system adapted to this request.

The distribution antenna system based on the centralized baseband pool of the conventional technology will be described below with reference to FIG. 9.

FIG. 9 is a system frame diagram of the distribution antenna system based on the centralized baseband pool. This system includes two important portions, and one portion is a distribution antenna network 204 including a plurality of remote radio heads 211 to 226 which transmit signals to user equipment, and the plurality of remote radio heads are flexibly arranged by using an optical fiber remote technology. The other portion is the centralized baseband pool 201, baseband portions of all the base station in the system are concentrated into one place to form one baseband pool. A resource allocation having high efficiency is performed by using a high-speed signal processing technology. The centralized baseband pool can largely reduce the number of necessary machine rooms, share matching of radio resources with the network, and is advantageous to an application of the CoMP technology. These two portions are connected via an improved optical transmission network 203, and a switcher 202 is controlled in real time by ports of the remote radio heads which perform service.

By using the CoMP technology, any of the above-described distribution antenna systems also can reduce interference between cells and improve a spectrum utilization factor of a cell. Obviously, it is unrealistic that all the remote radio heads of the entire network cooperate. After all, matters such as coordination is performed by using how many points, and how coordination is performed are a clustering problem on the remote radio head about which we just dispute. The clustering is to group the remote radio heads according to a certain rule. When the multi-point coordinated transmission/reception service is performed to users in the remote radio head of each group, throughput of the user can be sufficiently improved.

Static clustering and dynamic clustering of the remote radio head in the distribution antenna system of the conventional technology will be each described below with reference, to FIGS. 10, 11A and 11B.

FIG. 10 is a schematic diagram illustrating static clustering of the remote radio head of the distribution antenna system. In FIG. 10, a cluster size is 4. The "static clustering" is to already group the remote radio heads into clusters according to a fixed model in a planning stage of the system. After the network is planned, the clusters fail to be changed. As illustrated in FIG. 10, for example, 16 remote radio heads of the entire network are grouped into four clusters. Any size (the number of the remote radio heads in the cluster) of the clusters 1, 2, 3, and 4 is 4. User equipment which moves to each cluster receives only service from four remote radio heads of the cluster. The above-described clustering method is relatively simple, has low flexibility, and the throughput of the system is limited. For example, the user equipment D1 of FIG. 10 is located at the center of the cluster 1 and the cluster 1 provides preferable service for the user equipment D1. On the other hand, the user equipment D2 is located at the edge between the clusters 1 and 2, when the cluster 2 provides service for the user equipment 2, large interference occurs with respect to the cluster 1.

FIGS. 11A and 11B are schematic diagrams illustrating dynamic clustering of the remote radio head of the distribution antenna system. In FIGS. 11A and 11B, a cluster size is 2. The "dynamic clustering" is to dynamically change a configuration of the cluster between one period of time to another period of time. For example, FIG. 11A illustrates a clustering result of the time N, and FIG. 11B illustrates a clustering result of the time N+1. In the above-described method, a comprehensive judgment is normally performed based on channel state information of real time between mobile facilities and each remote radio head. Further, the method has a complicated algorithm, high flexibility, and high throughput of the system.

A multi-point transmission problem of the distribution antenna system is sometimes mentioned also in the conventional technology.

In WO 2010/077192 A1, a method for measuring a subcell in the distribution antenna system is disclosed. Practically speaking, the above-described distribution system is conventionally a wireless remote system based on the base station. In the patent, a "concept of the subcell" corresponds to an area covered by one Remote Radio Head (RRH) of the patent. A pair of subcells provides service for mobile user equipment in a coordinated manner. However, in this patent, it is not mentioned that by using what method, multiple "subcells" are combined together and service is provided for mobile user equipment in a coordinated manner. It is simply mentioned that service is provided for the mobile user equipment in a coordinated manner by using two or more subcells.

In CN 101777941A, a downlink transmission method of the multi-point transmission system is proposed; however, a method for clustering a coordinated cell is not specifically mentioned.

In CN 101185270 A, a dynamic distribution, antenna selection system of a wireless communication base station and an implementation method thereof are disclosed. Practically speaking, the above-described distribution antenna system is conventionally a wireless remote system based on the base station. The implementation method of this invention is to select N pieces of antennas from among K pieces of antenna units for transmission. In the patent, it is simply introduced that a method for selecting an antenna is to perform a dynamic selection based on obstacles of environment, a type of work, and a position of a user, and a specific algorithm is not described.

In CN 101631379, power allocation and antenna selection method in a distribution antenna system are proposed. A base station takes the statistics of received antenna signal strength of each user equipment for averaging in a predetermined time, performs power allocation only to an antenna having the averaged antenna signal strength larger than a threshold, and selects an antenna having preferable radio channels, thus implementing a communication with mobile user equipment. However, since selecting an antenna based on an uplink signal strength, the above-described, method is not applied to an FDD system which is not related to an uplink and a downlink.

SUMMARY OF THE INVENTION

In the above-described proposal and patent, attention is almost focused on benefits obtained by a multi-point transmission, such as reduction in interference between cells, and a large improvement in throughput. In an actual system, a multi-point coordinated transmission/reception technology fails to be always required from hour to hour. Conditions that the multi-point coordinated transmission/reception technology is not required will be described below with reference to FIG. 1.

FIG. 1 is an exemplification diagram illustrating a scene not suited to a multi-point coordinated transmission/reception. A reference numeral 501 denotes a cover range of a remote radio head. When the user equipment D1 is located at the center of a cover area 501 of a remote radio head 511, a signal received from the remote radio head 511 is extremely strong; however, a signal received from remote radio heads 512, 513, and 514 is weak. Therefore, in the above scene; performance is sufficient only by the single point transmission through the remote radio head 511. Only when the user equipment moves to a peripheral border of the remote radio head 511, it is considered that the performance needs to be improved by the multi-point transmission.

In view of the foregoing, it is an object of the present invention to provide a mobile communication system which has high flexibility, saves radio resources, and supports multiple-base station coordination service, and a remote radio head clustering method thereof.

According to one aspect of the present invention, there is provided a mobile communication system. The mobile communication system includes a plurality of remote radio heads configured to transmit a signal to user equipment and configure an antenna network; and a centralized baseband pool configured to be connected to the antenna network, wherein the centralized baseband pool performs clustering with respect to the plurality of remote radio heads so as to dynamically vary the number of the remote radio heads each included in a plurality of clusters.

According to another aspect of the present invention, there is provided a remote radio head clustering method for use in a mobile communication system having a plurality of remote radio heads to transmit a signal to user equipment and configure an antenna network and a centralized baseband pool connected to the antenna network. The method includes performing clustering with respect to the plurality of remote radio heads so as to dynamically vary the number of the remote radio heads each included in a plurality of clusters.

In the mobile communication system and remote radio head clustering method thereof according to the present invention, not only the clustering method is dynamic but also a cluster size is variable. When a cluster size is 1, the single point transmission is used, and on the other hand, when a cluster size is larger than 1, the multi-point transmission is used. The clustering method based on a "clustering gain" is used, and after all, which transmission method is used is determined as well as each cluster size is determined.

According to the mobile communication system and remote radio head clustering method thereof of the present invention, flexibility of the mobile communication system is further improved and radio resources is saved.

BRIEF DESCRIPTION OF THE DRAWINGS

FIG. 1 is an exemplification diagram illustrating a scene not suited to a multi-point coordinated transmission/reception of a conventional technology;

FIG. 5 is a signaling interactive diagram illustrating a dynamic clustering method based on a "clustering gain" of the present invention;

FIG. 6 is an algorithm flowchart illustrating a dynamic clustering method based on a "clustering gain" of the present invention; and FIG. 7A illustrates a simple implementation example of a dynamic clustering method based on a "clustering gain" of the present invention;

FIG. 7B illustrates a simple implementation example of a dynamic clustering method based on a "clustering gain" of the present invention;

FIG. 7C illustrates a simple implementation example of a dynamic clustering method based on a "clustering gain" of the present invention;

FIG. 8 illustrates a distribution antenna system based on an LTE/LTE-A base station of a conventional technology;

FIG. 9 is a system frame diagram illustrating a distribution antenna system based on a centralized baseband pool of a conventional technology;

DETAILED DESCRIPTION OF THE INVENTION

Embodiments of the present invention will be described below with reference to FIGS. 2A to 6.

A distribution antenna system based on a centralized baseband pool of the present invention is obtained by improving the distribution antenna system based on the centralized baseband pool of a conventional technology illustrated in FIG. 9. Accordingly, only points different from a conventional technology will be described in detail.

A mobile communication system of the present invention includes a plurality of remote radio heads which transmit signals to user equipment and configure an antenna network, and a centralized baseband pool connected to the antenna network. The centralized baseband pool performs clustering to the plurality of remote radio heads so as to dynamically vary the number of the remote radio heads included in each of a plurality of clusters. In the mobile communication system of the present invention, the number of the remote radio heads included in each of the plurality of clusters dynamically varies between one to n (n is a natural number of 2 or more). In the mobile communication system of the present invention, the centralized baseband pool further performs clustering to the plurality of remote radio heads in the ascending order of the number of the included remote radio heads. In the mobile communication system of the present invention, the centralized baseband pool further performs clustering to the plurality of remote radio heads based on an SINR value to each user equipment. In the mobile communication system of the present invention, after the centralized baseband pool performs clustering to the plurality of remote radio heads, the remote radio heads different in the number are further included in each cluster.

Figure 2A:
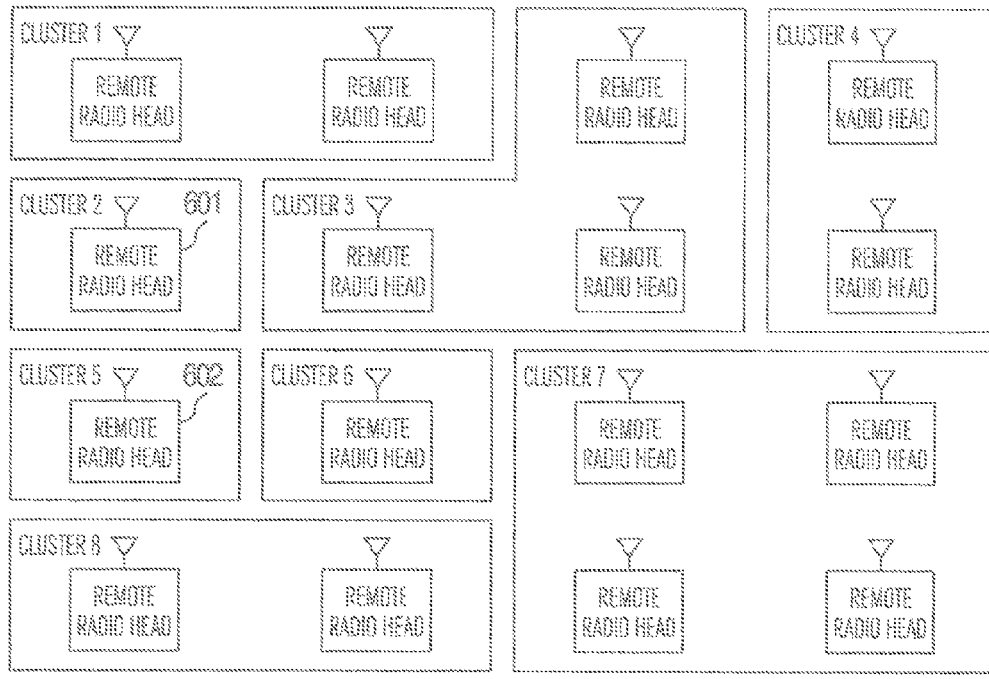
FIG. 2A is a schematic diagram illustrating a clustering result based on a "clustering gain" of the present invention.
Figure 2B:
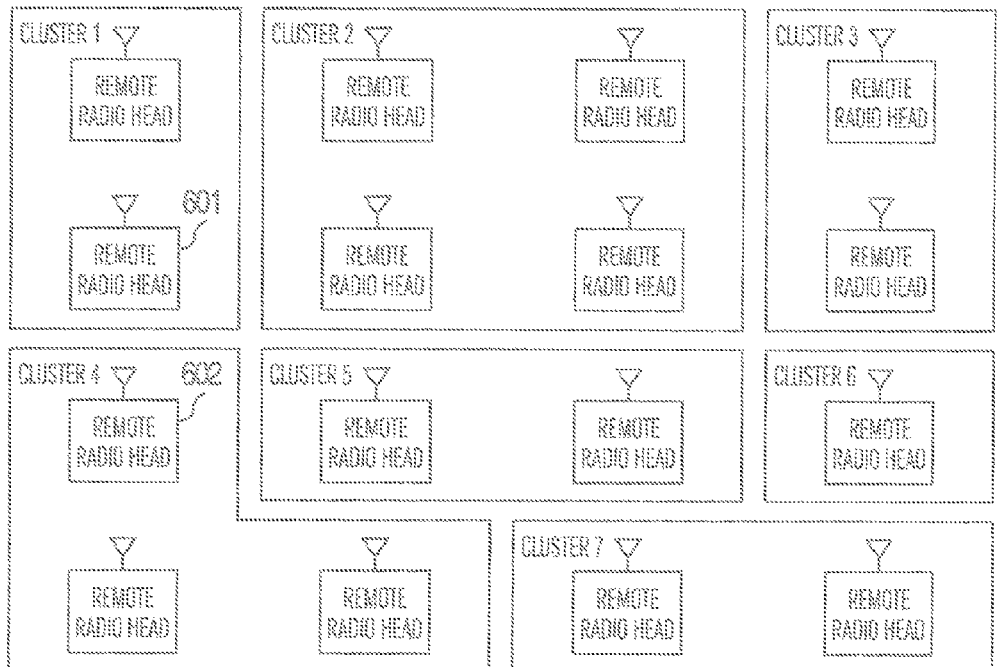
FIG. 2B is a schematic diagram illustrating a clustering result based on a "clustering gain" of the present invention.

FIGS. 2A and 2B are schematic views of clustering results based on a "clustering gain" of the present invention. As can be seen from FIGS. 2A and 2B, in the different scheduling time, the clustering results dynamically vary between multi-point transmission and single point transmission. As illustrated in FIG. 2A, in the previous time (the time N), the remote radio heads 601 and 602 belong to clusters 2 and 5, respectively, and stay in a single point transmission state. As illustrated in FIG. 2B, in the next time (the time N+1), along with the other remote radio head, the remote radio head 601 configures a cluster 1 having a cluster size of 2, and on the other hand, along with the other two remote radio heads; the remote radio head 602 configures a cluster 4 having a cluster size of 3, and stays in a multi-point transmission state.

A configuration of the centralized baseband pool of the present invention will be described below with reference to FIG. 3.

Figure 3:
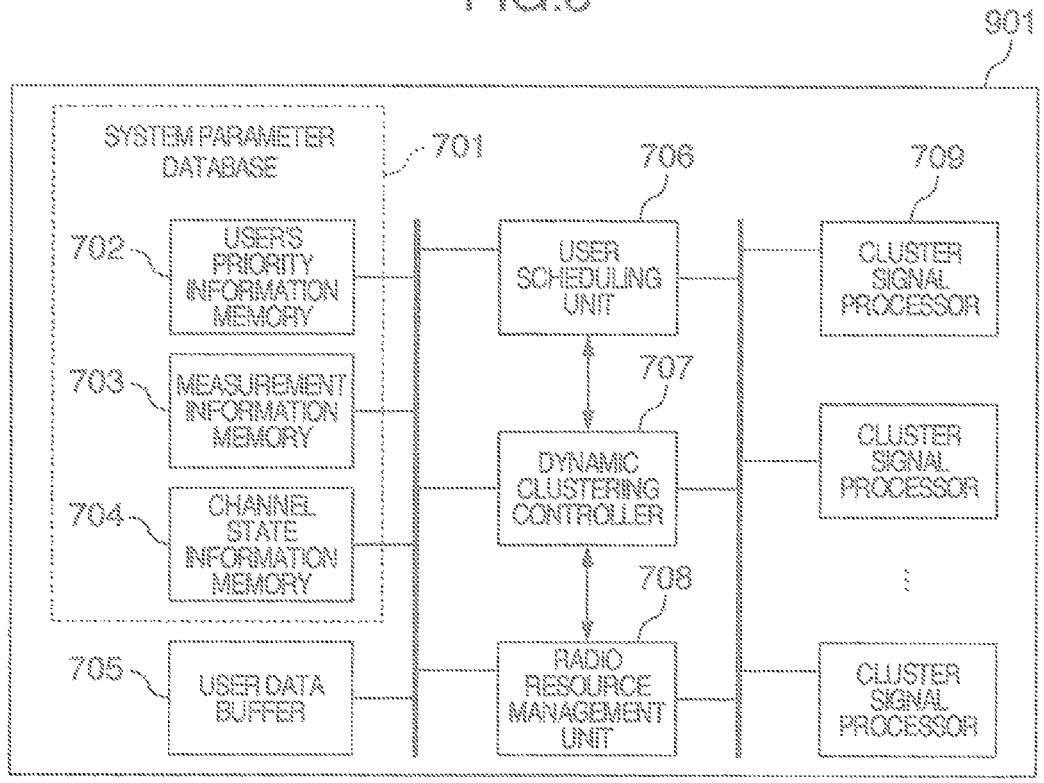
FIG. 3 is a schematic diagram illustrating an internal function module of a centralized baseband pool of the present invention.

FIG. 3 is a schematic diagram illustrating an internal function module of the centralized baseband pool of the present invention.

As illustrated in FIG. 3, the centralized baseband pool 901 has a system parameter database 701 including a user's priority information memory 702, a measurement information memory 703, and a channel state information memory 704, a user scheduling unit 706, a dynamic clustering controller 707, a radio resource management unit 708, and a plurality of cluster signal processing units 709.

In the system parameter database 701, all parameters for fixed setting and manual setting of a network such as a radio bearer parameter, a power control parameter, and a switching parameter are stored. Here, only a part relating to the present invention will be described.

The user's priority information memory 702 stores a scheduling priority of users. Each RRH has a sheet of user's priority list table, and is discriminated by an ID of the remote radio head. A specific generation process will be described later in a portion for the user scheduling unit 706.

TABLE 1

Typical Example of User's Priority List Table
ID of Remote Radio Head = RRH ID

| User Equipment ID | Priority Parameter |
|---|---|
| $UE_1$ | $\Pi_{PF}(1)$ |
| $UE_2$ | $\Pi_{PF}(2)$ |
| $UE_8$ | $\Pi_{PF}(8)$ |
| $UE_{11}$ | $\Pi_{PF}(11)$ |
| ... | ... |
| $UE_n$ | $\Pi_{PF}(n)$ |

The measurement information memory 703 stores information on an adjacent remote radio head arranged in each of the remote radio heads. When being connected to a remote radio head having a mobile station, the system transmits one row (a main service remote radio head corresponding to the mobile station) from this list table to the corresponding mobile station, and allows it to perform measurement. As can be seen from the above discussion, an effective measurement range and feedback overhead of the mobile station can be largely reduced.

A table 2 represents a typical example of a manually set measurement information table. A first column represents remote radio head IDs of the entire network. Any of these remote radio heads can serve as a main service remote radio head for user equipment. For the user equipment, the main service remote radio head is a remote radio head which transmits a best receive signal, and can provide network interactive signaling information for the user equipment. Second to last columns represent adjacent remote radio heads arranged for these remote radio heads. A mobile station measures only channel state information on the main service remote radio head and the adjacent remote radio head. For example, when the main service remote radio head for user equipment is an $RRH_3$, the network transmits a measurement control message including a row corresponding to the $RRH_3$ to the user equipment. After the user equipment receives the measurement control message, the mobile station measures also channel state information on $RRH_2$, $RRH_4$, $RRH_6$, $RRH_7$, and $RRH_8$ in addition, to the $RRH_3$. In this example, in each remote radio head, six adjacent remote radio heads can be arranged at a maximum. In the real system, the parameters can be adjusted according to complexity and performance.

TABLE 2

Typical Example of Manually Set Measurement Information Table

| Main Service Remote Radio Head ID | Adjacent Remote Radio Head ID | Adjacent Remote Radio Head ID | Adjacent Remote Radio Head ID | Adjacent Remote Radio Head ID | Adjacent Remote Radio Head ID | Adjacent Remote Radio Head ID |
|---|---|---|---|---|---|---|
| $RRH_1$ | $RRH_2$ | $RRH_3$ | $RRH_5$ | $RRH_6$ | | |
| $RRH_2$ | $RRH_1$ | $RRH_3$ | $RRH_5$ | $RRH_6$ | $RRH_7$ | |
| $RRH_3$ | $RRH_2$ | $RRH_4$ | $RRH_6$ | $RRH_7$ | $RRH_8$ | |
| $RRH_6$ | $RRH_1$ | $RRH_2$ | $RRH_3$ | $RRH_5$ | $RRH_7$ | $RRH_9$ |
| ... | ... | ... | ... | ... | ... | ... |
| $RRH_n$ | $RRH_{n-2}$ | $RRH_{n-1}$ | $RRH_{n+1}$ | | | |

Figure 4:
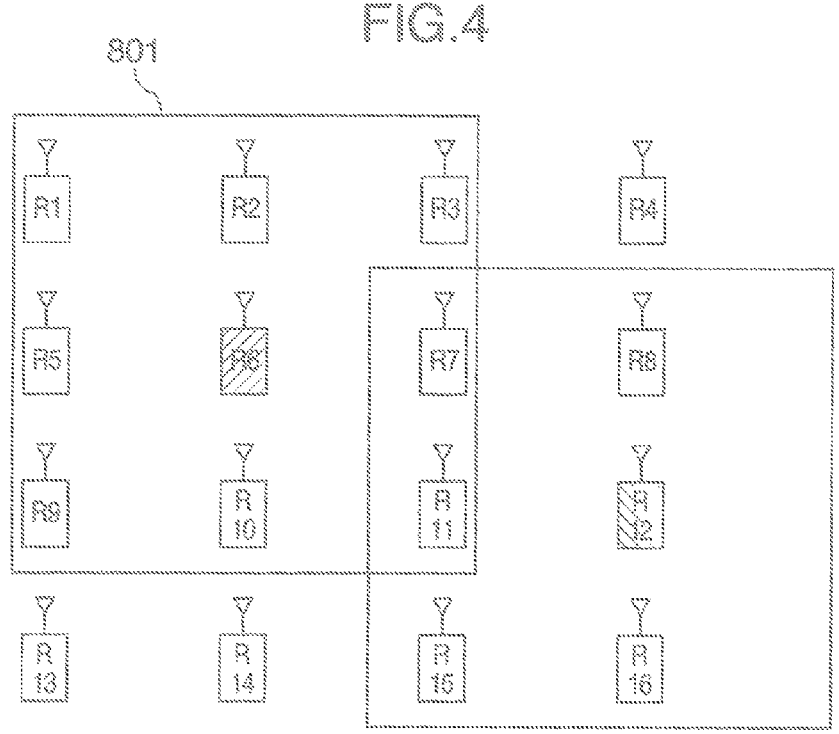
FIG. 4 is a schematic diagram illustrating a measurement based on a measurement window of the present invention.
Figure 10:
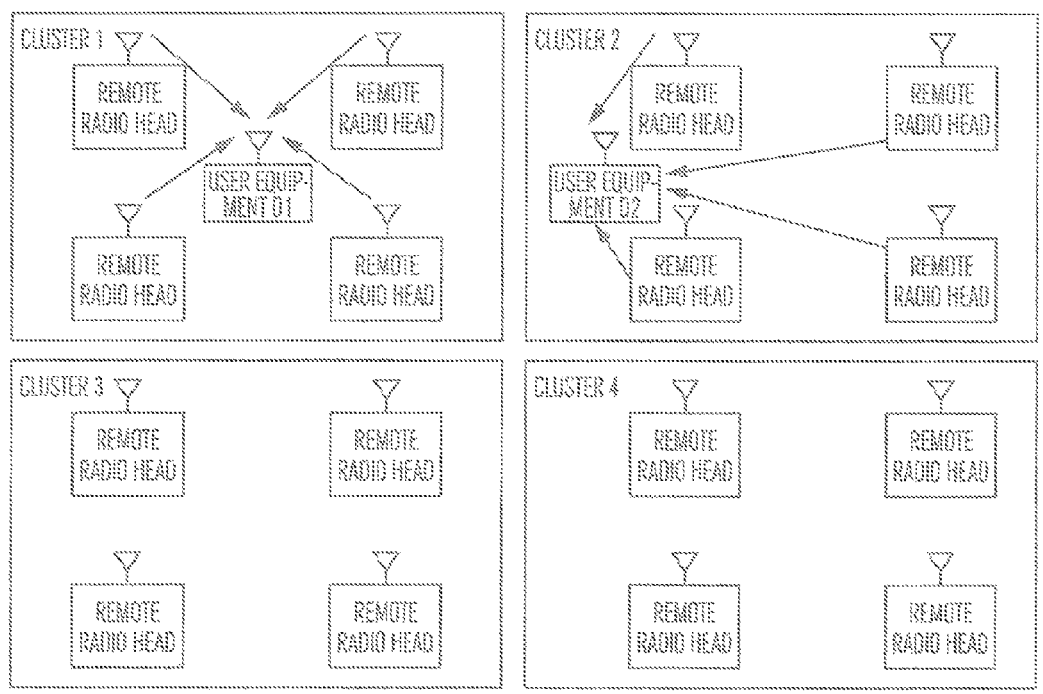
FIG. 10 is a schematic diagram illustrating static clustering of a remote radio head of a conventional technology, in which a cluster size is fixed.

As one method for simply implementing measurement setting, the measurement setting is implemented through a quadrangular or circular measurement window. A measurement method through the quadrangular measurement window is as illustrated in FIG. 4. A table 3 represents a typical example of a measurement information table based on the quadrangular measurement window of an RRH distribution illustrated in FIG. 4.

TABLE 3

Typical Example of Measurement Information Table based on Rectangular Measurement Window

| main service RRH ID | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|
| $RRH_1$ | $RRH_2$ | $RRH_5$ | $RRH_6$ | | | | | |
| $RRH_2$ | $RRH_1$ | $RRH_3$ | $RRH_5$ | $RRH_6$ | $RRH_7$ | | | |
| $RRH_3$ | $RRH_2$ | $RRH_4$ | $RRH_6$ | $RRH_7$ | $RRH_8$ | | | |
| $RRH_6$ | $RRH_1$ | $RRH_2$ | $RRH_3$ | $RRH_5$ | $RRH_7$ | $RRH_9$ | $RRH_{10}$ | $RRH_{11}$ |
| ... | | | | | | | | |
| $RRH_{16}$ | $RRH_{11}$ | $RRH_{12}$ | $RRH_{15}$ | | | | | |

The channel state information memory 704 stores the measured channel state information corresponding to different user equipment. Each user equipment reports measurements of the channel state information between the main service remote radio head and each adjacent remote radio head based on contents of the measurement information table (table 2). The channel state information table as indicated in a table 4 is obtained, and stored in the measurement information memory 703.

TABLE 4

Typical Example of Channel State Information Table

| User Equipment ID | Main Service Remote Radio Head ID/CSI | Adjacent Remote Radio Head ID/CSI | Adjacent Remote Radio Head ID/CSI | Adjacent Remote Radio Head ID/CSI | Adjacent Remote Radio Head ID/CSI | Adjacent Remote Radio Head ID/CSI | Adjacent Remote Radio Head ID/CSI |
|---|---|---|---|---|---|---|---|
| $UE_1$ | $RRH_1$ $h_{12}$ | $RRH_2$ $h_{21}$ | $RRH_3$ $h_{31}$ | $RRH_5$ $h_{51}$ | $RRH_6$ $h_{61}$ | | |
| $UE_2$ | $RRH_1$ $h_{11}$ | $RRH_2$ $h_{22}$ | $RRH_3$ $h_{32}$ | $RRH_5$ $h_{52}$ | $RRH_6$ $h_{62}$ | | |
| $UE_3$ | $RRH_2$ $h_{23}$ | $RRH_1$ $h_{13}$ | $RRH_3$ $h_{33}$ | $RRH_5$ $h_{53}$ | $RRH_6$ $h_{63}$ | $RRH_7$ $h_{73}$ | |
| $UE_4$ | $RRH_6$ $h_{64}$ | $RRH_1$ $h_{14}$ | $RRH_2$ $h_{24}$ | $RRH_3$ $h_{34}$ | $RRH_5$ $h_{54}$ | $RRH_7$ $h_{74}$ | $RRH_9$ $h_{94}$ |
| ... | ... | ... | ... | ... | ... | ... | ... |
| $UE_m$ | $RRH_n$ $h_{nm}$ | $RRH_{n-2}$ $h_{(n-2)m}$ | $RRH_{n-1}$ $h_{(n-1)m}$ | $RRH_{n+1}$ $h_{(n+1)m}$ | | | |

In the user data buffer 705, the received or transmission waiting user data is stored.

The user scheduling unit 706 performs scheduling to a user of the system. In the system, a large amount of non-real time packet data work is present. Since the total channel capacity of the system is limited, the user scheduling unit 706 needs to determine a type of work based on a QoS request of the user, select several users, and perform service in a predetermined time. Suppose that in the patent; the user uses a total buffer business model. Suppose, in other words, that all users have requests to transmit data all the while. Any of the respective RRHs calculate priority parameters of my own user based on the proportional fair principle, dispose them in the descending order, and acquire a user's priority list table, thus storing them in the user's priority information memory 702. A method for specifically calculating a priority parameter of a certain user k is as represented in a formula 1.

$$\prod_{PF}(k) = \frac{r_k}{\overline{R}_k} \qquad \text{Formula 1}$$

(In the formula 1, a symbol $r_k$ denotes a real time transmission rate of the scheduling time, and a symbol $\overline{R}_k$ denotes an average transmission rate in a time window in a past certain fixed period of the user k.

The dynamic clustering controller 707 is a most important portion of the present invention. The dynamic clustering controller 707 performs clustering based on a "clustering gain", and performs switching between the single point transmission and the multi-point transmission (or, between the multi-point transmissions with different cluster sizes).

The radio resource management unit 708 mainly performs resource allocation such as power allocation with respect to the separated clusters.

The cluster signal processing unit 709 is generated in real time according to results of the dynamic clustering controller 706. For example, when the plurality of remote radio heads are separated into n pieces of clusters, the centralized baseband pool 901 has n pieces of cluster signal processing units. The cluster signal processing unit 709 mainly performs signal processing in clusters, for example, coordination precoding, modtilation/demodulation, coding/decoding, and frequency spread/inverse spread.

FIG. 4 is a measurement schematic diagram based on a measurement window of the present invention. Along with a movement of the user, a measurement range is a quadrangular area having a length of X meters and a width of Y meters with a central focus on specific positions (e.g., longitude and latitude) of a main service RRH, called a quadrangular measurement window 801, and X and Y are arbitrarily set, if necessary. Each of the RRHs in this area automatically serves as an RRH measured by User Equipment (UE). As illustrated in FIG. 4, when a main service RRH of the user is an R6, the measurement range includes RRHs in the quadrangular measurement window at the upper left. When a main service RRH of the user is an R12, the measurement range includes six RRHs in the quadrangular measurement window at the lower right; namely, includes R7, R8, R11, R12, R15, and R16. As described above, analogy is performed. Actually, this is semiautomatic measurement setting. A size of the quadrangular area can be flexibly changed based on the amount of work of a network at present, and the network further performs searching from a database based on a size of the set measurement window. For example, when a working load of the remote radio head R6 is heavy, the centralized baseband pool uses a relatively large quadrangular area, increases the number of coordinated cells, imparts UE a better room for selection, and averages a part of the load into the above cells.

FIG. 5 is a signaling interactive diagram of a dynamic clustering method based on a "clustering gain" of the present invention.

At step 902, the centralized baseband pool 901 transmits a measurement control message to the remote radio heads R1, R2, . . . , and RN. The measurement control message includes a measurement information field including a measurement ID, measurement subject information, and measurement report setting. In a measurement subject information field, an adjacent remote radio head list table is included. Specifically, one row of the main service remote radio head corresponding to the mobile station of the table 1 is used for measuring the corresponding channel state information through the mobile station. The centralized baseband pool 901 needs to further provide setting information including the number of reference signal ports and reference signal pattern (CSI-RS pattern) of each RRH to be measured.

At step 903, the user equipment D1, D2, . . . , and Dm performs channel estimation according to the received signals, and calculates channel state information between the user equipment and each of the main service remote radio head and the adjacent remote radio head.

At step 904, the user equipment D1, D2, . . . , and Dm transmits the measurement report message including the measured remote radio head ID and the corresponding channel state information to the centralized baseband pool 901 via a network and switchers.

At step 905, the centralized baseband pool 901 receives the channel state information transmitted from the user equipment D1, D2, . . . , and Dm, and then updates the channel state information stored in the channel state information memory 704. A format of the channel state information is as illustrated in FIG. 9.

At step 906, the user scheduling unit 706 of the centralized baseband pool 901 performs sorting to users of each RRH based on the proportional fair principle. When acquiring the user's priority list, the user scheduling unit 706 updates the user's priority information stored in the user's priority information memory 702.

At step 907, the dynamic clustering controller 707 performs clustering by using a method based on the "clustering gain". The above method will be described later with reference to FIG. 6.

At step 908, the centralized baseband pool 901 dynamically generates the information processing unit 709 of each cluster.

At step 909, the centralized baseband pool 901 allocates radio resources according to each cluster.

At step 910, the centralized baseband pool 901 transmits processed data to each antenna port of the remote radio heads R1, R2, . . . , and RN.

At step 911, the remote radio heads R1, R2, . . . , and RN each provide for the user equipment a service of the single point transmission or multi-point transmission.

A dynamic switching method being a transmission system of the distribution antenna system of the present invention will be described below with reference to FIG. 6.

FIG. 6 is an algorithm flowchart illustrating a dynamic clustering method based on the "clustering gain" of the present invention.

At step 1001, when user equipment having highest priority is selected from the user's priority list table (refer to the table 1) of each RRH, M pieces of user equipment are selected (M≤N, N represents the total number of the RRHs of the network).

At step 1002, the RRHs are initialized, B is set to a set of N pieces of the RRHs, and U is set to a set of M pieces of the user equipment.

At step 1003, an Signal to Interference-plus-Noise Ratio (SINR) of M pieces of the user equipment is calculated based on the single point transmission. The SINR of the user equipment k is represented by a formula 2.

$$SINR_1(k) = \frac{\|h_{ik} w_i\|^2 P_i}{\sum_{j \neq i, j \in S_i} \|h_{jk} w_j\| P_j + N}$$ Formula 2

In the formula 2, a numerator represents a received effective signal, $h_{ik}$ represents channel state information from the main service remote radio head $RRH_i$ to the $UE_k$, wi represents a precoding matrix from the $RRH_i$, and $P_i$ represents transmission power from the $RRH_i$. A first term of a denominator represents interference, si represents an adjacent remote radio head set, of the main service remote radio head $RRH_i$ to which user equipment belongs, and $h_{jk}$ represents channel state information from the adjacent service remote radio head $RRH_j$ to the $UE_k$. A second term N of the denominator represents additive Gaussian white noise. In the formula 2, since all of the channel state information units h are stored in the centralized baseband pool 901 (refer to the table 4), the precoding matrix w is obtained by SVD decomposition of a channel h.

At step 1004, the distribution antenna system determines whether an $SINR_1$ of the user equipment is larger than a threshold $T_1$. If Yes, this user equipment belongs to a user located at the center of the cell, or interference is small. If the $SINR_1$ is smaller than the threshold $T_1$, this user equipment belongs to a user located at the edge of the cell, or interference is large. The threshold T1 is a predetermined value. The dynamic clustering controller 707 fine adjusts this value based on conditions of a current network load from a pair of experience values (e.g., {−1 dB, 0 dB, 1 dB, and 2 dB}). The dynamic clustering controller 707 allocates the main service RRH to a user in which the SINR is larger than the T1 to perform the single point transmission, sets to 1 a size of the cluster to which the user belongs, and writes its results in a clustering result table.

TABLE 5

Typical Example of Clustering Gain Table

| Cluster Number | Cluster Size | RRH of Cluster | Service User |
|---|---|---|---|
| $C_1$ | 1 | $RRH_i$ | $UE_i$ |
| $C_2$ | 1 | $RRH_j$ | $UE_j$ |

TABLE 5-continued

Typical Example of Clustering Gain Table

| Cluster Number | Cluster Size | RRH of Cluster | Service User |
|---|---|---|---|
| $C_3$ | 2 | $RRH_m, RRH_n$ | $UE_m, UE_n$ |
| ... | | ... | |
| $C_m$ | | $RRH_k, RRH_f, RRH_g$ | $UE_k, UE_f, UE_g$ |

At step 1005, the RRH and user equipment already combined into a pair are deleted from the sets B and U, respectively. For the purpose of simplifying an algorithm, one RRH is here supposed to belong to only one cluster at one time zone, and fail to be jointly used by a plurality of clusters. One user equipment is further supposed to belong to only one cluster at one time zone, and fail to use resources for a plurality of clusters at the same time.

At step 1006, the distribution antenna system determines whether the set B of RRHs waiting to be selected at this time is an empty set, that is, RRHs are already allocated. If Yes, the algorithm terminates. If No, the process proceeds to step 1007.

At step 1007, the distribution antenna system determines whether the set U of user equipment waiting to be selected at this time is an empty set, that is, user equipment receives service. If Yes, the algorithm terminates. If No, the process proceeds to step 1008.

At step 1008, the distribution antenna system adds 1 to a cluster size c, and prepares for determination of the multi-point transmission of the next priority.

At step 1009, the distribution antenna system determines whether a cluster size c of this time exceeds the limit of a maximum cluster size $C_{max}$. If Yes, the process advances to step 1013. On the other hand, if No, the process proceeds to step 1010. In a multi-point coordination service, it is not necessary to use a number of "points". As the number of points increases more, not only complexity rapidly increases more but also overhead of a send-back link increases more. Also, a gain of the multi-point transmission further reaches a saturation state. Therefore, in the actual, system, the maximum number of points of the multi-point transmission, namely, the maximum value $C_{max}$ of the cluster size here said ought to be limited. Based on an experience value, this value is normally set to 3 or 4.

At step 1010, a combination is performed according to the cluster size c by using the remaining RRHs. Each RRH is set as the main service RRH, c−1 pieces of RRHs are selected from a set of all available adjacent RRHs of the measurement information table (e.g., table 2 or 3) to combine a cluster having a size c, thus creating $$\sum_{i \in B} C_{S_j}^{c-1}$$

kinds of combinations. An $SINR_c$ of the user equipment k is represented by a formula 3.

$$SINR_c(k) = \frac{\sum_{i \in C} \|h_{ik} w_i\|^2 P_i}{\sum_{j \notin C, j \in S_1} \|h_{jk} w_j\| P_j + N}$$

Formula 3

In the formula 3, C represents a set of the RRHs included in a cluster which provides service for user equipment. When all the RRHs in the cluster C perform effective data transmission for user equipment, a numerator represents effective signals received by the user equipment. The main service $RRH_1$ of the user equipment is necessarily included in the cluster. A first term of the denominator represents interference outside the cluster, and is mainly derived from RRHs belonging to a set $S_1$ of the adjacent remote radio heads of the main service remote radio head, $RRH_1$, failing to belong to this cluster, to which the user equipment belongs. A specific description on a parameter is the same as that of the measurement control message of step 902 of FIG. 4.

At step 1011, a clustering gain of each combination in $$\sum_{i \in B} C_{S_j}^{c-1}$$

is calculated. When a cluster size is set to c, a clustering gain $G_c$ for simultaneously providing service for multiple user equipment is as represented in a formula 4.

$$G_c = \frac{R_c}{R_1} = \frac{\sum_{k \in K_c} \log_2(1 + SINR_c(k))}{\sum_{k \in K_c} \log_2(1 + SINR_1(k))}$$

Formula 4

In the formula 4, $R_c$ is a sum of data rates obtained by the multi-point coordination service of the cluster through the user equipment belonging to the cluster c. $R_1$ is a sum of data rates obtained by the single cell service through the user equipment belonging to the cluster c.

When the clustering gains are arranged in the descending order based on a clustering value, a clustering gain table is obtained. A table 6 illustrates a display example of the clustering gain having a cluster size of 3. In the table 6, all combinations of available RRHs are arranged, and RRHs in the cluster ought to be selected based on the measurement information table as a restrictive condition. When a combination of the same RRH appears, only one of the combinations is held. For example, when cluster information overlapped in clusters 1 and 4 of the table 6 is included, namely, the same RRHs are included in the cluster, data of the cluster 4 is deleted.

TABLE 6

Typical Example of Clustering Gain Table (C = 3)

| Cluster Number | RRH of Cluster | Value of $G_c$ |
|---|---|---|
| $Cluster_1$ | $RRH_2, RRH_3, RRH_4$ | $G_{c,1}$ |
| $Cluster_2$ | $RRH_2, RRH_3, RRH_6$ | $G_{c,2}$ |
| $Cluster_3$ | $RRH_2, RRH_4, RRH_6$ | $G_{c,3}$ |
| ~~$Cluster_4$~~ | ~~$RRH_2, RRH_3, RRH_6$~~ | ~~$G_{c,4}$~~ |
| ... | ... | ... |
| $Cluster_f$ | $RRH_{16}, RRH_{14}, RRH_{15}$ | $G_{c,f}$ |

At step 1012, the distribution antenna system searches the clustering gain table from top to bottom based on a Greedy method, and selects a cluster which satisfies conditions in which $G_c$ is larger than $T_c$. When an RRH included in a certain cluster waiting to be selected already belongs to the preselected cluster, this cluster is not selected again.

$T_c$ is a gain threshold at the time when a cluster size is c (c>1), and defined as $T_c=1+O_c$. With respect to the clustering gain $G_c$, a sum of rates obtained by all the user equipment of the cluster having a size c is divided by a sum of rates obtained at the time when all of the above user equipment uses the single point transmission. Therefore, in order that the multi-point transmission may have a gain, the $G_c$ ought to be at least larger than 1. The $O_c$ is a gain factor of the multi-point transmission in which a cluster size is c. A gain of the multi-point transmission is obtained by consuming extra resources for a part of the system, and includes an extra signaling overhead for transmission, an RE resource occupation overhead (e.g., pilot occupation), and a calculation complexity overhead. A user equipment feedback overhead for the multi-point transmission in which a cluster size is c is sometimes more than c times of that for the single point transmission. In addition to transmission of channel information in the single point-transmission, since, relative channel information between points also is transmitted, it is considered that the multi-point transmission is simply 2c times as much as the single point transmission in the resource occupation overhead (e.g., pilot occupation) of RE. When a pilot signal is transmitted at one point, all of the same time frequency resources of the other points need to be reserved. With respect to the calculation complexity overhead, as c more increases, an index more increases. Therefore, a mapping modeling as to how an overhead is performed to bring about a gain is an extremely complicated process. In this patent, for the purpose of simplifying descriptions, the $O_C$ is supposed to perform dynamic allocation based on an actual desirable value for management, and this value is supposed to become large according to an increase in c. In consideration of preferable feedback, for example, the value is present in the range of 0.1 to 0.4. However, in actual conditions, the feedback is not ideal by the effect of design of a code book, quantization error, and a delay of feedback. Therefore, this value can be appropriately adjusted downward.

At step 1013, the main service RRH is allocated to the remaining user equipment which fails to satisfy conditions to perform the single point transmission.

A dynamic switching method for use in a transmission system of the distribution antenna system of the present invention is described above. However, the present invention is not limited, thereto, and can be changed according to need.

In a process of FIG. 6, for example, starting with the cluster size c of 1, the cluster size c is increased one by one to perform clustering. Naturally, a value of the cluster size c at the time of performing clustering and a change order of the cluster size c are appropriately changeable depending on the situation.

A simple example of the dynamic clustering method based on the "clustering gain" of the present invention will be described below with reference to FIG. 7.

FIG. 7 illustrates a simple example of the dynamic clustering method based on the "clustering gain" of the present invention. As illustrated in FIG. 7, nine remote radio service heads are arranged in a network, and represented by using numerals of 1 to 9, respectively. A maximum cluster size is set to 3.

Step 1: According to step 1001 of FIG. 6, one RRH having a largest priority is selected from a user's priority list table of each RRH. A measurement information table as illustrated in a table 7 is here created according to a method illustrated in FIG. 4.

TABLE 7

| main service RRH ID | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|
| $RRH_1$ | $RRH_2$ | $RRH_4$ | $RRH_5$ | | | | | |
| $RRH_2$ | $RRH_1$ | $RRH_3$ | $RRH_4$ | $RRH_5$ | $RRH_6$ | | | |
| $RRH_3$ | $RRH_2$ | $RRH_5$ | $RRH_6$ | | | | | |
| $RRH_4$ | $RRH_1$ | $RRH_2$ | $RRH_5$ | $RRH_7$ | $RRH_8$ | | | |
| $RRH_5$ | $RRH_1$ | $RRH_2$ | $RRH_3$ | $RRH_4$ | $RRH_6$ | $RRH_7$ | $RRH_8$ | $RRH_9$ |
| $RRH_6$ | $RRH_2$ | $RRH_3$ | $RRH_5$ | $RRH_8$ | $RRH_9$ | | | |
| $RRH_7$ | $RRH_4$ | $RRH_5$ | $RRH_8$ | | | | | |
| $RRH_8$ | $RRH_4$ | $RRH_5$ | $RRH_6$ | $RRH_7$ | $RRH_9$ | | | |
| $RRH_9$ | $RRH_5$ | $RRH_6$ | $RRH_8$ | | | | | |

Each row of this measurement information table corresponds to one scheduled user. A channel state information table as illustrated in a table 8 is obtained based on the channel state information fed back from the user.

TABLE 8

| user ID | main service RRH ID/CSI | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|---|
| UE1 | $RRH_1/h_{11}$ | $RRH_2/h_{21}$ | $RRH_4/h_{41}$ | $RRH_5/h_{51}$ | | | | | |
| UE2 | $RRH_2/h_{22}$ | $RRH_1/h_{12}$ | $RRH_3/h_{32}$ | $RRH_4/h_{42}$ | $RRH_5/h_{52}$ | $RRH_6/h_{62}$ | | | |
| UE3 | $RRH_3/h_{33}$ | $RRH_2/h_{23}$ | $RRH_5/h_{53}$ | $RRH_6/h_{63}$ | | | | | |
| UE4 | $RRH_4/h_{44}$ | $RRH_1/h_{14}$ | $RRH_2/h_{24}$ | $RRH_5/h_{54}$ | $RRH_7/h_{74}$ | $RRH_8/h_{84}$ | | | |
| UE5 | $RRH_5/h_{55}$ | $RRH_1/h_{15}$ | $RRH_2/h_{25}$ | $RRH_3/h_{35}$ | $RRH_4/h_{45}$ | $RRH_6/h_{65}$ | $RRH_7/h_{75}$ | $RRH_8/h_{85}$ | $RRH_9/h_{95}$ |
| UE6 | $RRH_6/h_{66}$ | $RRH_2/h_{26}$ | $RRH_3/h_{36}$ | $RRH_5/h_{56}$ | $RRH_8/h_{86}$ | $RRH_9/h_{96}$ | | | |
| UE7 | $RRH_7/h_{76}$ | $RRH_4/h_{46}$ | $RRH_5/h_{56}$ | $RRH_8/h_{86}$ | | | | | |
| UE8 | $RRH_8/h_{88}$ | $RRH_4/h_{48}$ | $RRH_5/h_{58}$ | $RRH_6/h_{68}$ | $RRH_7/h_{78}$ | $RRH_9/h_{98}$ | | | |

TABLE 8-continued

| user ID | main service RRH ID/CSI | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|---|
| UE9 | $RRH_9/h_{99}$ | $RRH_5/h_{59}$ | $RRH_6/h_{69}$ | $RRH_8/h_{89}$ | | | | | |

Suppose that each user calculates an SINR of the single point transmission according to the method of step 1003 illustrated in FIG. 6 and acquires SINR values as indicated in a table 9.

Step 2: The allocated RRH, users (UE1, UE5, RRH1, and RRH5), and corresponding channel state information are deleted.

TABLE 11

| user ID | main service RRH ID/CSI | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|---|
| ~~UE1~~ | ~~$RRH_1/h_{11}$~~ | ~~$RRH_2/h_{21}$~~ | ~~$RRH_4/h_{41}$~~ | ~~$RRH_5/h_{51}$~~ | | | | | |
| UE2 | $RRH_2/h_{22}$ | ~~$RRH_1/h_{12}$~~ | $RRH_3/h_{32}$ | $RRH_4/h_{42}$ | ~~$RRH_5/h_{52}$~~ | $RRH_6/h_{62}$ | | | |
| UE3 | $RRH_3/h_{33}$ | $RRH_2/h_{23}$ | ~~$RRH_5/h_{53}$~~ | $RRH_6/h_{63}$ | | | | | |
| UE4 | $RRH_4/h_{44}$ | ~~$RRH_1/h_{14}$~~ | $RRH_2/h_{24}$ | ~~$RRH_5/h_{54}$~~ | $RRH_7/h_{74}$ | $RRH_8/h_{84}$ | | | |
| ~~UE5~~ | ~~$RRH_5/h_{55}$~~ | ~~$RRH_1/h_{15}$~~ | ~~$RRH_2/h_{25}$~~ | ~~$RRH_3/h_{35}$~~ | ~~$RRH_4/h_{45}$~~ | ~~$RRH_6/h_{65}$~~ | ~~$RRH_7/h_{75}$~~ | ~~$RRH_8/h_{85}$~~ | ~~$RRH_9/h_{95}$~~ |
| UE6 | $RRH_6/h_{66}$ | $RRH_2/h_{26}$ | $RRH_3/h_{36}$ | ~~$RRH_5/h_{56}$~~ | $RRH_8/h_{86}$ | $RRH_9/h_{96}$ | | | |
| UE7 | $RRH_7/h_{76}$ | $RRH_4/h_{46}$ | ~~$RRH_5/h_{56}$~~ | $RRH_8/h_{86}$ | | | | | |
| UE8 | $RRH_8/h_{88}$ | $RRH_4/h_{48}$ | ~~$RRH_5/h_{58}$~~ | $RRH_6/h_{68}$ | $RRH_7/h_{78}$ | $RRH_9/h_{98}$ | | | |
| UE9 | $RRH_9/h_{99}$ | ~~$RRH_5/h_{59}$~~ | $RRH_6/h_{69}$ | $RRH_8/h_{89}$ | | | | | |

TABLE 9

| Service User | SINR (k) |
|---|---|
| $UE_1$ | 2.52 |
| $UE_2$ | 0.83 |
| $UE_3$ | 0.75 |
| $UE_4$ | 1.42 |
| $UE_5$ | 1.98 |
| $UE_6$ | 1.27 |
| $UE_7$ | 0.98 |
| $UE_8$ | 0.35 |
| $UE_9$ | −1.3 |

The threshold T1 is set to 1 dB. Since the SINR values of users 1 and 5 exceed the threshold T1 by calculations, the users 1 and 5 perform the single point transmission through the main service base station, respectively. A table of clustering results of this time is as indicated in a table 10.

TABLE 10

| Cluster Number | Cluster Size | RRH of Cluster | Service User |
|---|---|---|---|
| $C_1$ | 1 | $RRH_1$ | $UE_1$ |
| $C_2$ | 1 | $RRH_5$ | $UE_5$ |

Up to here, two clusters (namely, one cluster denoted by a numeral 1 and another cluster denoted by a numeral 5) having a cluster size of 1 are obtained and a clustering state is as illustrated in FIG. 7A.

Based on the channel state information table of the table 1, a combination is performed with respect to the RRHs according to the method of step 1010 illustrated in FIG. 6. A clustering gain of two point transmission is calculated and a table 12 of a clustering gain list is obtained. In the table 12, combination results of the overlapped RRHs are deleted.

TABLE 12

| Cluster Number | RRH of Cluster | Value of $G_2$ |
|---|---|---|
| $Cluster_1$ | $RRH_2, RRH_3$ | $G_{2,1}$ (=1.01) |
| $Cluster_2$ | $RRH_2, RRH_4$ | $G_{2,2}$ (=0.8) |
| $Cluster_3$ | $RRH_2, RRH_6$ | $G_{2,3}$ (=0.9) |
| ~~$Cluster_4$~~ | ~~$RRH_3, RRH_2$~~ | — |
| $Cluster_5$ | $RRH_3, RRH_6$ | $G_{2,5}$ (=1.10) |
| ~~$Cluster_6$~~ | ~~$RRH_4, RRH_2$~~ | — |
| $Cluster_7$ | $RRH_4, RRH_7$ | $G_{2,7}$ (=1.5) |
| $Cluster_8$ | $RRH_4, RRH_8$ | $G_{2,8}$ (=0.85) |
| ~~$Cluster_9$~~ | ~~$RRH_6, RRH_2$~~ | — |
| ~~$Cluster_{10}$~~ | ~~$RRH_6, RRH_3$~~ | — |
| $Cluster_{11}$ | $RRH_6, RRH_8$ | $G_{2,11}$ (=1.03) |
| $Cluster_{12}$ | $RRH_6, RRH_9$ | $G_{2,12}$ (=0.77) |
| ~~$Cluster_{13}$~~ | ~~$RRH_7, RRH_4$~~ | — |
| $Cluster_{14}$ | $RRH_7, RRH_8$ | $G_{2,14}$ (=0.95) |
| ~~$Cluster_{15}$~~ | ~~$RRH_8, RRH_4$~~ | — |
| ~~$Cluster_{16}$~~ | ~~$RRH_8, RRH_6$~~ | — |
| ~~$Cluster_{17}$~~ | ~~$RRH_8, RRH_7$~~ | — |
| $Cluster_{18}$ | $RRH_8, RRH_9$ | $G_{c,18}$ (=1.2) |
| ~~$Cluster_{19}$~~ | ~~$RRH_9, RRH_6$~~ | — |
| ~~$Cluster_{20}$~~ | ~~$RRH_9, RRH_8$~~ | — |

The table 12 is newly sorted out, the overlapped cluster data is deleted, and the cluster data is arranged as indicated in a table 13 in the descending order of the clustering gain value.

TABLE 13

| Number | RRH of Cluster | Value of $G_2$ |
|---|---|---|
| 1 | $RRH_4, RRH_7$ | $G_{c,7}$ (=1.5) |
| 2 | $RRH_8, RRH_9$ | $G_{c,18}$ (=1.2) |
| 3 | $RRH_3, RRH_6$ | $G_{c,5}$ (=1.10) |
| 4 | $RRH_6, RRH_8$ | $G_{c,11}$ (=1.03) |
| 5 | $RRH_2, RRH_3$ | $G_{c,1}$ (=1.01) |
| 6 | $RRH_7, RRH_8$ | $G_{c,14}$ (=0.95) |
| 7 | $RRH_2, RRH_6$ | $G_{c,3}$ (=0.9) |
| 8 | $RRH_4, RRH_8$ | $G_{c,8}$ (=0.85) |
| 9 | $RRH_2, RRH_4$ | $G_{c,2}$ (=0.8) |
| 10 | $RRH_6, RRH_9$ | $G_{c,12}$ (=0.77) |

A combination in which $G_2$ is larger than $T_2$ is selected. When setting $T_2=1.15$, $O_2=0.15$ is obtained. That is, when considering an overhead through the coordination of two points, a system gain, needs to reach, at least 15%. The clusters selected through the algorithm of Greedy are {4, 7} and {8, 9}. A cluster result table as indicated in a table 14 is obtained.

TABLE 14

| Cluster Number | Cluster Size | RRH of Cluster | Service User |
|---|---|---|---|
| $C_1$ | 1 | $RRH_1$ | $UE_1$ |
| $C_2$ | 1 | $RRH_5$ | $UE_5$ |
| $C_3$ | 2 | $RRH_4, RRH_7$ | $UE_4, UE_7$ |
| $C_4$ | 2 | $RRH_8, RRH_9$ | $UE_8, UE_9$ |

Up to here, two clusters (namely, one cluster denoted by numerals 4 and 7 and another cluster denoted by numerals 8 and 9) having a cluster size of 2 are further obtained and a clustering state is as illustrated in FIG. 7B.

Step 3: The allocated RRH, users, and corresponding channel state information are deleted to acquire a table 15.

TABLE 15

| user ID | main service RRH ID/CSI | adjacent RRH ID | adjacent RRH ID | adjacent RRH ID | adjacent RRH ID | adjacent RRH ID | adjacent RRH ID | adjacent RRH ID | adjacent RRH ID |
|---|---|---|---|---|---|---|---|---|---|
| ~~UE1~~ | ~~$RRH_1/$~~ ~~$h_{11}$~~ | ~~$RRH_2/$~~ ~~$h_{21}$~~ | ~~$RRH_4/$~~ ~~$h_{41}$~~ | ~~$RRH_8/$~~ ~~$h_{81}$~~ | | | | | |
| UE2 | $RRH_2/$ $h_{22}$ | ~~$RRH_1/$~~ ~~$h_{12}$~~ | $RRH_3/$ $h_{32}$ | ~~$RRH_4/$~~ ~~$h_{42}$~~ | ~~$RRH_5/$~~ ~~$h_{52}$~~ | $RRH_6/$ $h_{62}$ | | | |
| UE3 | $RRH_3/$ $h_{33}$ | $RRH_2/$ $h_{23}$ | ~~$RRH_5/$~~ ~~$h_{53}$~~ | $RRH_6/$ $h_{63}$ | | | | | |
| ~~UE4~~ | ~~$RRH_4/$~~ ~~$h_{44}$~~ | ~~$RRH_1/$~~ ~~$h_{14}$~~ | ~~$RRH_2/$~~ ~~$h_{24}$~~ | ~~$RRH_3/$~~ ~~$h_{34}$~~ | ~~$RRH_7/$~~ ~~$h_{74}$~~ | ~~$RRH_8/$~~ ~~$h_{84}$~~ | | | |
| ~~UE5~~ | ~~$RRH_5/$~~ ~~$h_{55}$~~ | ~~$RRH_1/$~~ ~~$h_{15}$~~ | ~~$RRH_2/$~~ ~~$h_{25}$~~ | ~~$RRH_3/$~~ ~~$h_{35}$~~ | ~~$RRH_4/$~~ ~~$h_{45}$~~ | ~~$RRH_6/$~~ ~~$h_{65}$~~ | ~~$RRH_7/$~~ ~~$h_{75}$~~ | ~~$RRH_8/$~~ ~~$h_{85}$~~ | ~~$RRH_9/$~~ ~~$h_{95}$~~ |
| UE6 | $RRH_6/$ $h_{66}$ | $RRH_2/$ $h_{26}$ | $RRH_3/$ $h_{36}$ | ~~$RRH_5/$~~ ~~$h_{56}$~~ | ~~$RRH_8/$~~ ~~$h_{86}$~~ | ~~$RRH_9/$~~ ~~$h_{96}$~~ | | | |
| ~~UE7~~ | ~~$RRH_7/$~~ ~~$h_{77}$~~ | ~~$RRH_4/$~~ ~~$h_{47}$~~ | ~~$RRH_5/$~~ ~~$h_{57}$~~ | ~~$RRH_8/$~~ ~~$h_{87}$~~ | | | | | |
| ~~UE8~~ | ~~$RRH_8/$~~ ~~$h_{88}$~~ | ~~$RRH_4/$~~ ~~$h_{48}$~~ | ~~$RRH_5/$~~ ~~$h_{58}$~~ | ~~$RRH_6/$~~ ~~$h_{68}$~~ | ~~$RRH_7/$~~ ~~$h_{78}$~~ | ~~$RRH_9/$~~ ~~$h_{98}$~~ | | | |
| ~~UE9~~ | ~~$RRH_9/$~~ ~~$h_{99}$~~ | ~~$RRH_5/$~~ ~~$h_{59}$~~ | ~~$RRH_6/$~~ ~~$h_{69}$~~ | ~~$RRH_8/$~~ ~~$h_{89}$~~ | | | | | |

Based on the channel state information table of the table 15, the combination is performed with respect to the RRH according to the method of step 1010 illustrated in FIG. 6, and combination results of the overlapped RRHs are deleted. A clustering gain of three point transmission is calculated and a table 16 of a clustering gain list is obtained. $T_3=1.2$ is set. When considering an overhead through the coordination of three points, a system gain needs to reach at least 20%. The cluster selected through the algorithm of Greedy is {2, 3, 6}.

TABLE 16

| Cluster Sequence Number | RRH of Cluster | Value of $G_3$ |
|---|---|---|
| $Cluster_1$ | $RRH_2, RRH_3, RRH_6$ | $G_{3,1}$ (=1.33) |
| ~~$Cluster_2$~~ | ~~$RRH_2, RRH_3, RRH_5$~~ | = |
| ~~$Cluster_3$~~ | ~~$RRH_3, RRH_5, RRH_6$~~ | = |
| ~~$Cluster_4$~~ | ~~$RRH_3, RRH_6, RRH_2$~~ | = |
| ~~$Cluster_5$~~ | ~~$RRH_6, RRH_2, RRH_3$~~ | = |
| ~~$Cluster_6$~~ | ~~$RRH_6, RRH_3, RRH_2$~~ | = |

A clustering result table as indicated in a table 17 is then obtained.

TABLE 17

| Cluster Number | Cluster Size | RRH of Cluster | Service User |
|---|---|---|---|
| $C_1$ | 1 | $RRH_1$ | $UE_1$ |
| $C_2$ | 1 | $RRH_5$ | $UE_5$ |
| $C_3$ | 2 | $RRH_4, RRH_7$ | $UE_4, UE_7$ |
| $C_4$ | 2 | $RRH_8, RRH_9$ | $UE_8, UE_9$ |
| $C_5$ | 3 | $RRH_2, RRH_3, RRH_6$ | $UE_2, UE_3, UE_6$ |

Up to here, one cluster (namely, a cluster denoted by numerals 2, 3, and 6) having a cluster size of 3 is further obtained, and a clustering state is as illustrated in FIG. 7C.

At this time, both of the number of the remaining RRHs and the number of users in the system are zero, and the algorithm terminates.

The mobile communication system and remote radio head clustering method thereof of the present invention are described above. Subsequently, different points between the present invention and the conventional technology are simply compared with each other. In the dynamic clustering method of the conventional technology, a cluster size is fixed, and on the other hand, a cluster size is dynamically varied in the dynamic clustering method of the present invention. That is, all the cluster sizes of multiple included clusters are not the same as each other in a certain scheduling time. As a result, not only switching between the multi-point transmissions having different cluster sizes can be implemented (for example, clusters having cluster sizes of 2 and 3, respectively, are present), but also switching between two types of the transmission methods in which the single point transmission is essentially completely different from the multi-point transmission can be implemented (for example, clusters having cluster sizes of 1 and 2, respectively, are present).

Figure 11A:
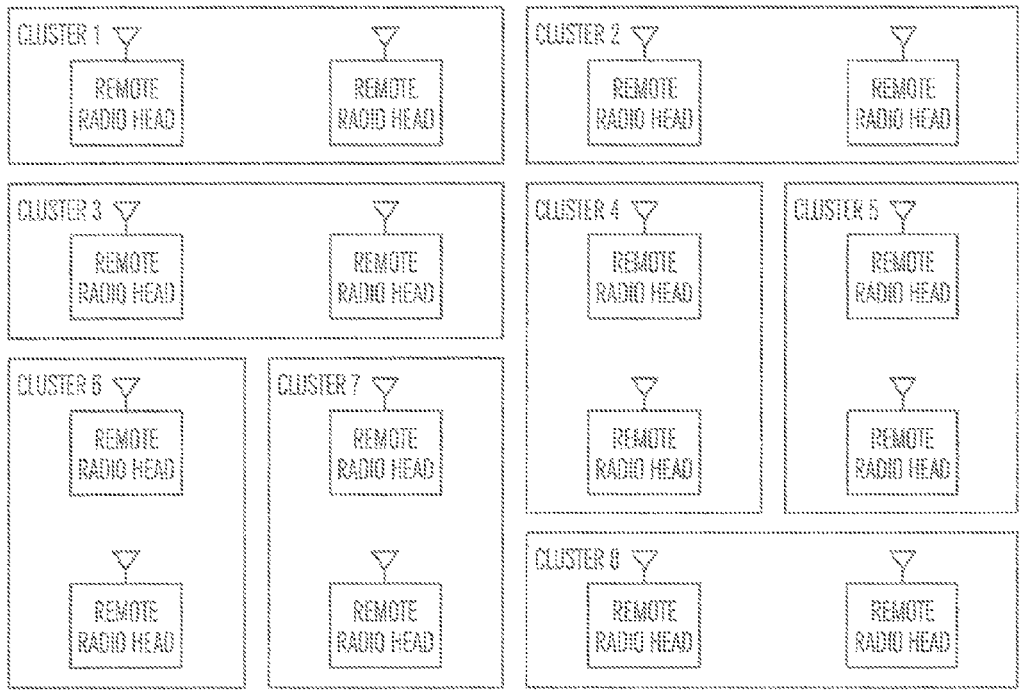
FIG. 11A is a schematic diagram illustrating dynamic clustering of a remote radio head in a distribution antenna system of a conventional technology, in which a cluster size is fixed.
Figure 11B:
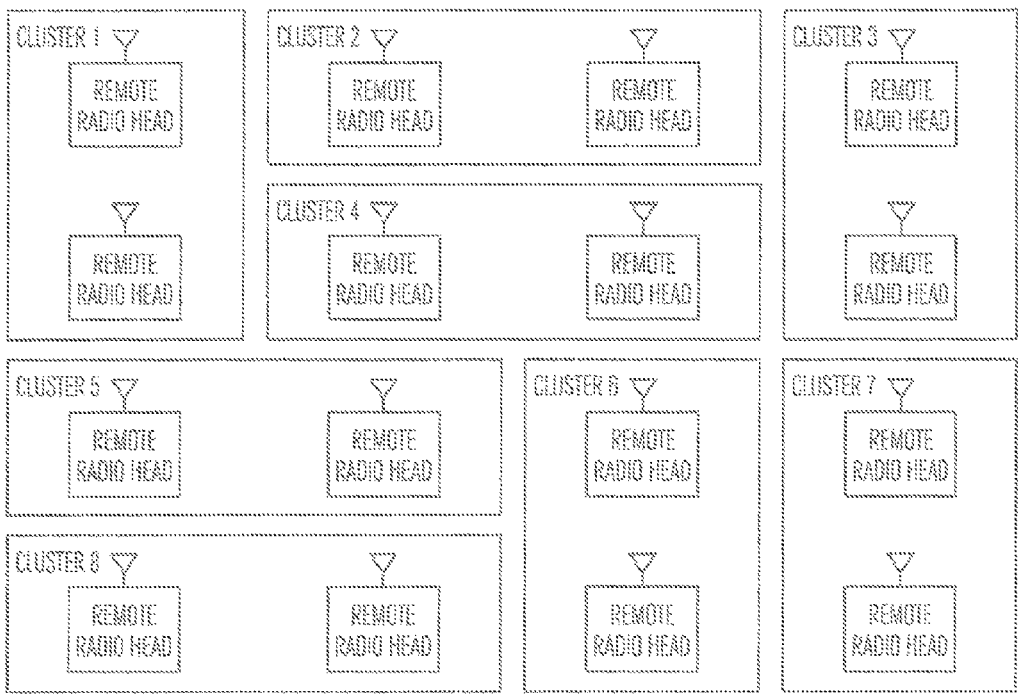
FIG. 11B is a schematic diagram illustrating dynamic clustering of a remote radio head in a distribution antenna system of a conventional technology, in which a cluster size is fixed.

Naturally, in a conventional technology, also when the number of the not-yet clustered remote radio heads is smaller than a cluster size, a cluster in which the number of the remote radio heads is smaller than the cluster size is present. In the condition 1 that a cluster size is 2 as illustrated in FIGS. 11A and 11B, for example, when the number of the remote radio heads is 17, a cluster having two remote radio heads is present, and at the same time, a cluster having one remote radio head is necessarily present. However, the presence of the cluster in which the number of the remote radio heads, is different from each other is passive, and the essence thereof is different from the present invention. The present invention actively changes the number of the remote radio heads in each cluster and reasonably allocates the remote radio heads in the distribution antenna system based on the centralized baseband pool.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile communication system comprising:
a plurality of remote radio heads configured to transmit a signal to user equipment and configure an antenna network; and
a centralized baseband pool configured to be connected to the antenna network, and
wherein the centralized baseband pool performs clustering with respect to the plurality of remote radio heads so as to dynamically vary a number of the remote radio heads that are included in each of a plurality of clusters, and
wherein the centralized baseband pool performs clustering with respect to the plurality of remote radio heads in an ascending order of the number of the remote radio heads that are included in each of the clusters, and
wherein upon each time the centralized baseband pool performs clustering, the number of remote heads included in a first cluster of the plurality of clusters is different than the number of remote radio heads included in a second cluster of the plurality of clusters.

2. The mobile communication system according to claim 1, wherein in one scheduling time, the number of the remote radio heads included in each of the plurality of clusters is dynamically varied between 1 and n (n is a natural number of 2 or more).

3. The mobile communication system according to claim 1, wherein the centralized baseband pool calculates a clustering gain based on an SINR value corresponding to each user equipment, and performs clustering with respect to the plurality of remote radio heads.

4. The mobile communication system according to claim 1, wherein, upon the centralized baseband pool performs clustering with respect to the plurality of remote radio heads, the number of the remote radio heads included in each of the clusters is different.

5. A remote radio head clustering method for use in a mobile communication system having a plurality of remote radio heads to transmit a signal to user equipment and configure an antenna network and a centralized baseband pool connected to the antenna network, the method comprising:
performing clustering with respect to the plurality of remote radio heads so as to dynamically vary a number of the remote radio heads that are included in each of a plurality of clusters, and
wherein clustering is performed with respect to the plurality of remote radio heads in an ascending order of the number of the remote radio heads that are included in each of the clusters, and
wherein upon each time clustering is performed with respect to the plurality of remote radio heads, the number of remote heads included in a first cluster of the plurality of clusters is different than the number of remote radio heads included in a second cluster of the plurality of clusters.

6. The method according to claim 5, wherein in one scheduling time, the number of the remote radio heads included in each of the plurality of clusters is dynamically varied between 1 and n (n is a natural number of 2 or more).

7. The method according to claim 5, wherein a clustering gain is calculated based on an SINR value corresponding to each user equipment, and clustering is performed with respect to the plurality of remote radio heads.

8. The method according to claim 5, wherein, upon clustering with respect to the plurality of remote radio heads being performed, the number of the remote radio heads included in each of the clusters is different.

* * * * *

UNITED STATES PATENT AND TRADEMARK OFFICE
CERTIFICATE OF CORRECTION

PATENT NO. : 8,908,602 B2
APPLICATION NO. : 13/403096
DATED : December 9, 2014
INVENTOR(S) : H. Yoshiuchi et al.

Page 1 of 1

It is certified that error appears in the above-identified patent and that said Letters Patent is hereby corrected as shown below:

ON THE TITLE PAGE

Please correct (30) Foreign Application Priority Data, as follows:

(30) Foreign Application Priority Data

Mar. 2, 2011   (CN) .................................... 2011 1 0056054.6

Signed and Sealed this
Thirtieth Day of June, 2015

Michelle K. Lee
*Director of the United States Patent and Trademark Office*